United States Patent
Soulat et al.

(10) Patent No.: US 11,415,011 B2
(45) Date of Patent: Aug. 16, 2022

(54) STATOR WHEEL OF A TURBOMACHINE COMPRISING VANES HAVING DIFFERENT CHORDS

(71) Applicant: SAFRAN AIRCRAFT ENGINES, Paris (FR)

(72) Inventors: Laurent Soulat, Moissy-Cramayel (FR); Eva Julie Lebeault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/430,964

(22) PCT Filed: Feb. 17, 2020

(86) PCT No.: PCT/EP2020/054017
§ 371 (c)(1),
(2) Date: Aug. 13, 2021

(87) PCT Pub. No.: WO2020/169499
PCT Pub. Date: Aug. 27, 2020

(65) Prior Publication Data
US 2022/0010685 A1     Jan. 13, 2022

(30) Foreign Application Priority Data
Feb. 19, 2019 (FR) ...................... 1901638

(51) Int. Cl.
*F01D 9/04* (2006.01)
(52) U.S. Cl.
CPC ........ *F01D 9/041* (2013.01); *F05D 2220/323* (2013.01); *F05D 2240/12* (2013.01)
(58) Field of Classification Search
CPC .......... F01D 5/141; F01D 5/147; F01D 9/041; F05D 2220/323
See application file for complete search history.

(56) References Cited

U.S. PATENT DOCUMENTS 9,097,125 B2 * 8/2015 Ghorbani Zarimahalleh .............. F01D 5/16
10,302,100 B2 * 5/2019 Xu .......................... F01D 5/143
(Continued)

FOREIGN PATENT DOCUMENTS

| EP | 3369893 A1 | 9/2018 |
| FR | 2681644 A1 | 3/1993 |
| FR | 3032495 A1 | 8/2016 |

OTHER PUBLICATIONS

Search Report from the French Intellectual Property Office on corresponding FR application (FR1901638) dated Sep. 19, 2019.
(Continued)

*Primary Examiner* — Michael Lebentritt
*Assistant Examiner* — Brian Christopher Delrue
(74) *Attorney, Agent, or Firm* — Klein, O'Neill & Singh, LLP

(57) ABSTRACT

A stator wheel of a turbomachine configured to be mounted in an aircraft, the turbomachine extending along an axis, the turbomachine comprising a core flow stream for a first air flow and a bypass flow stream for a second air flow, wherein the stator wheel is configured to be mounted along the axis, the stator wheel comprising a plurality of vanes extending radially from the axis, each vane comprising a leading edge and a trailing edge that together define a chord in a plane of revolution defined relative to the axis, at least two vanes having different chords at a same radial distance, the difference in chords between two adjacent vanes being less than or equal to 25%.

11 Claims, 4 Drawing Sheets

(56) References Cited

U.S. PATENT DOCUMENTS

| | | | |
|---|---|---|---|
| 10,436,044 B2* | 10/2019 | Schlemmer | F01D 9/041 |
| 2011/0255964 A1 | 10/2011 | Clemen | |
| 2016/0017796 A1* | 1/2016 | Xu | F02C 3/06 |
| | | | 415/208.2 |
| 2017/0022835 A1* | 1/2017 | Clark | F01D 9/06 |
| 2017/0159465 A1* | 6/2017 | Schlemmer | F01D 5/16 |
| 2018/0306041 A1* | 10/2018 | Peters | F01D 9/065 |
| 2018/0335050 A1* | 11/2018 | Lurie | F01D 5/146 |
| 2019/0024521 A1* | 1/2019 | Hoeger | F01D 9/065 |
| 2020/0270995 A1* | 8/2020 | Maar | F01D 5/141 |

OTHER PUBLICATIONS

International Search Report and Written Opinion on corresponding PCT application (PCT/EP2020/054017) from International Searching Authority (EPO) dated Apr. 17, 2020.

* cited by examiner

STATOR WHEEL OF A TURBOMACHINE COMPRISING VANES HAVING DIFFERENT CHORDS

TECHNICAL FIELD

This invention relates to the field of turbomachines used for the propulsion of an aircraft and more particularly to a turbomachine stator wheel.

BACKGROUND

With reference to FIG. 1, an aircraft turbomachine 1 extends longitudinally along an axis X so that the aircraft can be displaced making use of an air flow entering the turbomachine 1 and circulating in the direction from upstream to downstream, in a known manner. In the following, the terms "upstream" and "downstream" are defined relative to the longitudinal X axis in the direction from upstream to downstream. Similarly, the terms "inner" and "outer" are defined along the radial direction relative to the X axis.

The turbomachine 1 comprises a compressor, a combustion chamber and an upstream fan 2, that is mounted around the X axis and is used to draw an air flow into the turbomachine 1. As represented in FIG. 1, the turbomachine 1 comprises an outer casing 11 in which the fan 2 is mounted and an intermediate casing 12, delimiting a core flow stream V1 internal to the intermediate casing 12, and a bypass flow stream V2 between the intermediate casing 12 and the outer casing 11. When the turbomachine 1 is operating, the fan 2 generates an air flow from upstream to downstream that is decomposed into a first air flow F1 circulating in the core flow stream V1 and that can supply the compressor and a second air flow F2 circulating in the bypass flow stream V2 so as to be ejected downstream from the turbomachine 1.

In a known manner, the turbomachine 1 comprises at least one stator wheel comprising a plurality of stator vanes 3, also referred to as "guide vanes", mounted radially and uniformly spaced in the bypass flow stream V2 of the turbomachine 1 between the intermediate casing 12 and the outer casing 11, in order to straighten the second air flow F2 that was twisted by rotation of the fan 2. These stator vanes 3 are known to an expert in the field under their acronym OGV for "Outlet Guide Vane". Such a stator wheel is, for example, disclosed in patent application FR3004749.

A principal function of a stator wheel is to change the direction of the second air flow F2 in order to modify the kinetic energy so that it may be exploited to provide thrust for turbomachine 1. The stator wheel can thus reduce aerodynamic losses, guarantee good efficiency of the turbomachine 1 and guarantee robustness of the angle of incidence of the air flow to guarantee stable operation of the turbomachine 1. In a known manner, the stator vanes 3 have a precise and predefined geometry to optimize performance of the above-mentioned functions. The stator vanes 3 are sized to have a predefined section and orientation to optimize deviation of the second air flow F2.

However, a stator wheel can also perform a structural, thermal or aerodynamic role. For example, the stator wheel may be required to improve the resistance and transmission of forces in the turbomachine or the heat exchange between the hot core air flow F1 circulating inside the intermediate casing 12 and a cold bypass air flow F2 circulating outside said intermediate casing 12.

The section of the stator vanes 3 needs to be increased in order to increase their mechanical stiffness and thus reduce the stresses applied to each, so as to perform these complementary functions. The surface area in contact with the second air flow F2 also needs to be increased so as to maximize the heat flux. The profile of a stator vane 3 designed to carry heat exchanges is thus different from the profile that results in optimum aerodynamic performances. In a known manner, a stator wheel comprises a plurality of identical stator vanes 3, the profile of which is determined by a compromise between aerodynamic and thermal performances. Such a solution is not optimal because it affects the performances of the turbomachine.

Also, in order to limit these disadvantages, one objective of the invention is to disclose a stator wheel capable of performing the straightening function and an aerodynamic, structural and/or thermal function, without penalizing the performances of the turbomachine.

Incidentally, patent application FR3004749 discloses a stator wheel comprising thickened stator vanes and stator arms comprising ancillaries. Such stator arms cannot be combined with stator vanes and are very thick.

Patent application FR2681644A1 discloses a turbojet for a supersonic airplane comprising a separation plane so as to reduce acoustic waves. The thickness and the chord of some stator vanes may be changed. In particular, the length of a vane may be doubled. Documents US 2011/255964 A1 and FR3032495 A1 also disclose that some vanes with at least double the length can be provided.

SUMMARY

To achieve this, the invention relates to a stator wheel of a turbomachine configured to be mounted in an aircraft, the turbomachine extending along an axis, said turbomachine comprising a core flow stream for a first air flow and a bypass flow stream for a second air flow in which the stator wheel is configured to be mounted about the axis, the stator wheel comprising a plurality of vanes extending radially from the axis, each vane comprising a leading edge and a trailing edge that together define a chord in a plane of revolution defined relative to the axis.

The invention is remarkable in that at least two vanes have different chords at the same radial distance.

According to one preferred aspect, the difference in chords between two adjacent vanes is less than or equal to 25%. Preferably, the difference in chords applies to all adjacent vanes, in other words to the entire revolution of the stator vanes assembly. The difference in chords between two adjacent vanes in pairs is thus globally limited.

Such a stator wheel advantageously provides a means of performing a role to straighten the second air flow in the bypass flow stream and also a structural, aerodynamic and/or thermal role, while limiting penalization of turbomachine performances. The integration of vanes with different chords makes it possible for a single vane or a limited number of vanes of the wheel to perform a secondary role in a specialized manner. In addition, the reduced difference in chords makes it possible to assure that no local disturbance affects the flow of the second air flow in the bypass flow stream. In other words, the wheel according to the invention makes it possible to adapt the chord of a limited number of vanes depending on the role that it performs, without it being necessary to modify all the vanes that could affect the overall functioning and performances of the turbomachine.

Such a stator wheel is contrary to established practices aimed at equipping the stator wheel with vanes with chords with identical values at the same radial distance.

Preferably, at least one vane has a first minimum chord and at least one vane has a second maximum chord. The stator wheel comprises at least one interleaved vane, mounted between said vanes, having a third chord between said first chord and said second chord. The integration of an interleaved vane with an intermediate chord makes it possible to provide a smooth transition of the length of the vanes, advantageously making it possible to limit local flow disturbances in the second air flow in the bypass flow stream. Thus, stator performances are not affected by the wheel geometry and the air flow through the bypass flow stream is optimal at the outlet from the turbomachine, so that good efficiency of the turbomachine can be guaranteed.

Preferably, the stator wheel comprises at least two interleaved vanes, mounted between said vanes, having different chords between said first chord and said second chord. The use of several interleaved vanes is advantageous to provide smooth transitions between vanes with large chord differences.

Preferably, the chords increase between said first chord and said second chord making a gradual transition possible between the different vane profiles so as to limit local disturbances.

According to one aspect, the difference in chords between two adjacent vanes is greater than or equal to 5%, preferably greater than or equal to 10%, so that the vanes may be specialized depending on their main role (aerodynamic, thermal, structural, etc.).

According to one aspect, the difference in the maximum thickness between two adjacent vanes with different chords is less than or equal to 5%.

According to another aspect, the relative thickness of a vane corresponding to the ratio of the maximum thickness and the chord, the difference in the relative thickness between two adjacent vanes with different chords is less than or equal to 10%.

The invention also relates to a turbomachine designed to be mounted in an aircraft, the turbomachine extending along an axis, said turbomachine comprising a core flow stream for circulation of a first air flow and a bypass flow stream for circulation of a second air flow in which a stator wheel, as described above, is mounted along the axis.

The invention also relates to an aircraft comprising a turbomachine as described above.

BRIEF DESCRIPTION OF THE DRAWINGS

The invention will be better understood after reading the following description, given solely as an example, and with reference to the appended drawings given as non-limitative examples, wherein identical references are given to similar objects and wherein.

It should be noted that the figures present the invention in a detailed manner so that the invention can be put into practice, obviously said figures can be used to better define the invention if necessary.

DETAILED DESCRIPTION

The invention is described in this document with reference to a turbomachine mounted in an airplane, however it is obviously applicable to any type of aircraft.

Figure 1:
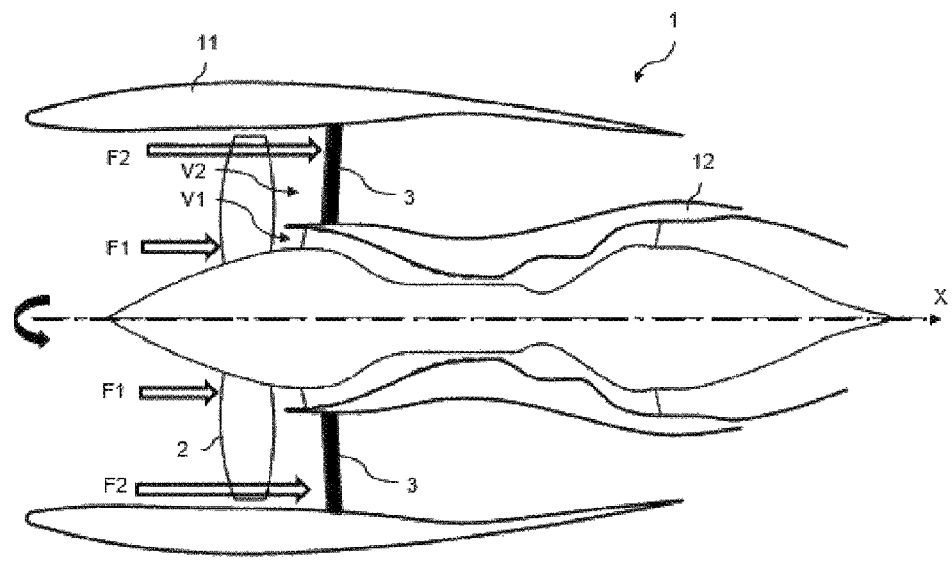
FIG. 1 is a diagrammatic longitudinal sectional representation of a turbomachine according to prior art.
Figure 2:
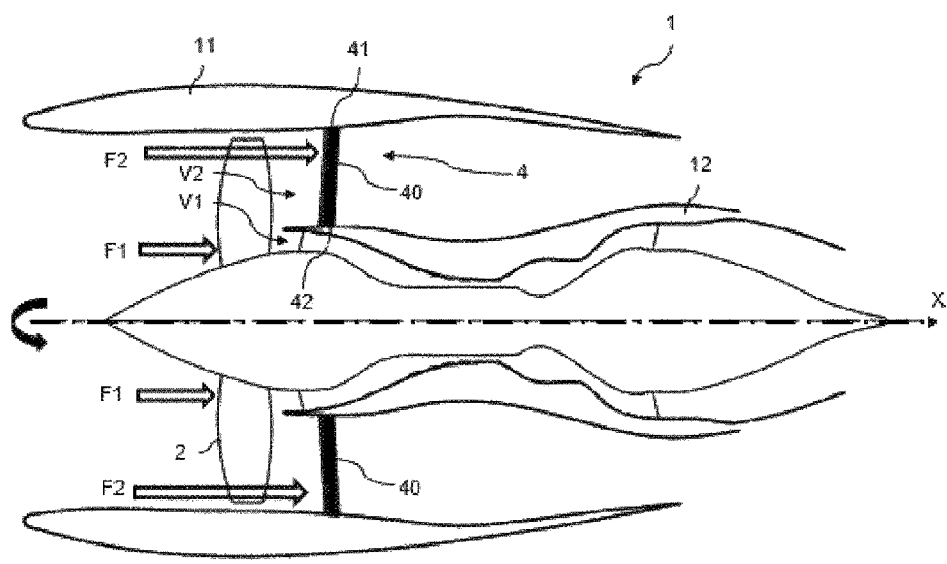
FIG. 2 is a diagrammatic longitudinal sectional representation of a turbomachine according to the invention.

A turbomachine according to the invention is presented in FIG. 2. For reasons of clarity and conciseness, identical references are used in FIGS. 1 and 2 to identify identical or similar characteristics. To achieve this, with reference to FIG. 1, the aircraft turbomachine 1 extends longitudinally along an axis X so that the airplane can be displaced making use of an air stream entering the turbomachine 1 and circulating in the direction from upstream to downstream. In the following, the terms "upstream" and "downstream" are defined relative to the longitudinal X axis in the direction from upstream to downstream. Similarly, the terms "inner" and "outer" are defined along the radial direction relative to the longitudinal axis X.

In a known manner, the turbomachine 1 comprises a compressor, a combustion chamber and an upstream fan 2, that is mounted free to rotate about the X axis and is used to draw in an air flow. As represented in FIG. 2, the turbomachine 1 has an outer casing 11 in which the fan 2 is mounted and an intermediate casing 12, delimiting a core flow stream V1 internal to the intermediate casing 12, and a bypass flow stream V2 between the intermediate casing 12 and the outer casing 11. When the turbomachine 1 is operating, the fan 2 generates an air flow from upstream to downstream that is decomposed into a first air flow F1 circulating in the core flow stream V1 and that can supply the compressor and a second air flow F2 circulating in the bypass flow stream V2 so as to be ejected downstream from the turbomachine 1.

With reference to FIG. 2, the turbomachine 1 comprises a stator wheel 4 comprising a plurality of stator vanes 40, also referred to as "guide vanes", mounted radially and uniformly spaced in the bypass flow stream V2 of the turbomachine 1 between the intermediate casing 12 and the outer casing 11, in order to straighten the second air flow F2 that was twisted by rotation of the fan 2. These stator vanes 40 are known to an expert in the field under their acronym OGV for "Outlet Guide Vane". In this example, the stator wheel 4 comprises an outer shell 41 belonging to the outer casing 11 and an inner shell 42 belonging to intermediate casing 12. The stator vanes 40 extend radially between outer shell 41 and inner shell 42 as illustrated in FIG. 2.

Figure 3:
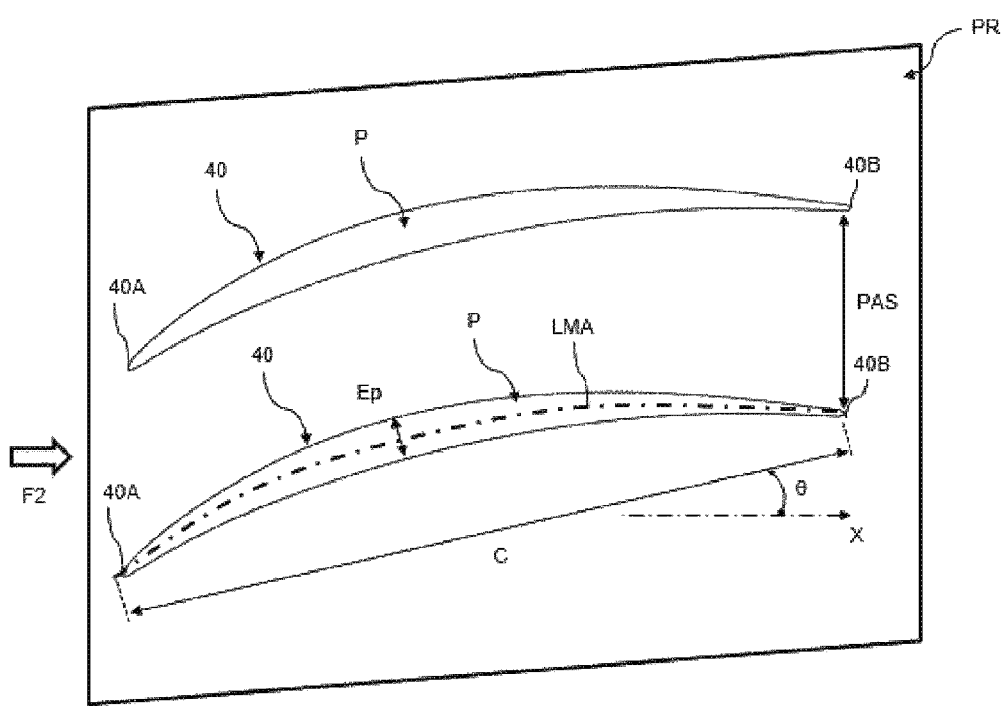
FIG. 3 is a sectional view in a plane of revolution of two stator vanes.

In a known manner and with reference to FIG. 3, each stator vane 40 comprises a leading edge 40A, corresponding to the upstream end and coming into contact first with the second air flow F2, and a trailing edge 40B, located downstream. In a known manner, a vane 40 has a profile that is defined, in section, in a plane of revolution PR around the axis X of the-turbomachine 1, represented in FIG. 2. A plane of revolution PR is defined for a predetermined radial distance.

A stator vane 40 means a classic stator vane and not a component through which a rotating shaft passes through the bypass flow stream V2.

In the plane of revolution PR, with reference to FIG. 3, each vane 40 has an elongated profile P from the leading edge 40A to the trailing edge 40B. In a known manner, the profile P is defined according to a plurality of geometric characteristics such as for example a length and a thickness.

In this example, the profile P of a vane 40 is characterized by the distance between the leading edge 40A and the trailing edge 40B, referred to as the chord C, and the maximum thickness Ep. In this example, the maximum thickness Ep is defined orthogonal to the direction of the vane mean line LMA. As illustrated in FIG. 3, this mean line LMA (also known to an expert in the field as a skeleton line or camber line) connects the leading edge 40A to the trailing edge and is equidistant from the intrados and the extrados. Similarly, still with reference to FIG. 3, a vane 40 is characterized by the inclination of its chord P relative to the X axis of the turbomachine 1 (the axis of revolution). In the following, for a profile P, an angle of incidence θ is defined between the X axis and the chord C. Finally, a stator wheel 4 is characterized by its pitch PAS corresponding to the space between the trailing edges 40B of two adjacent stator vanes 40 as illustrated in FIG. 3.

In the following, a first profile P1 of a vane 40 is defined that is designed to perform an aerodynamic function and to straighten the air flow, and a second profile P2 of a vane 40 is defined that is designed to perform a thermal function and improve heat exchanges between the core air flow F1 circulating inside the intermediate casing 12 and the second air flow F2 circulating outside the intermediate casing 12 of the turbomachine 1.

As disclosed in prior art, when a stator wheel 4 is configured to perform an aerodynamic role only, it comprises only vanes with a first aerodynamic profile P1. Similarly, when a stator wheel 4 is configured to perform a thermal role only, it comprises only vanes with a second thermal profile P2. In such a stator wheel, the pitch PAS is also the same between two adjacent vanes 40.

According to the invention, the stator wheel 4 comprises at least two vanes 40 with a different chord C, so that the stator wheel 4 can perform a thermal and aerodynamic role while limiting the impact on the performances of the turbomachine 1. The profile P of a vane 40 is directly proportional to the chord C of such a vane 40. Also, an increase in the chord C causes an increase in the section, for example to lower mechanical stresses on the vanes 40 of the wheel. Similarly, an increase in the chord C leads to an increase in the volume of the vane 40, which advantageously enables an increase in the surface area in contact with the air flow entering the turbomachine 1, thus maximizing heat exchanges.

According to one aspect, the profile P of the vanes 40 between the leading edge 40A and the trailing edge 40B has a substantially identical maximum thickness Ep for the two vanes 40 with different chords C. Preferably, the maximum thickness Ep is defined at a position between 20% and 70% of the chord C, wherein 0% corresponds to the position of the leading edge 40A and 100% corresponds to the position of the trailing edge 40B. A substantially identical maximum thickness Ep means that the variation of the maximum thickness Ep is less than 5%. Thus, a variation of the chord is obtained with a constant maximum thickness.

According to another aspect, the profile P of the vanes 40 between the leading edge 40A and the trailing edge 40B has a substantially identical relative thickness for the two vanes 40 with different chords C. The relative thickness is defined as the ratio of the maximum thickness Ep and the chord C. A substantially identical relative thickness means that the variation in the relative thickness is less than 10%. Thus, a variation of the chord is obtained with constant relative thickness. Preferably, the ratio of the relative thickness of a vane with an elongated chord and the relative thickness of a vane with a normal chord is less than 1,1. Such a ratio helps to limit local flow disturbances between two adjacent vanes with different chords.

Figure 4:
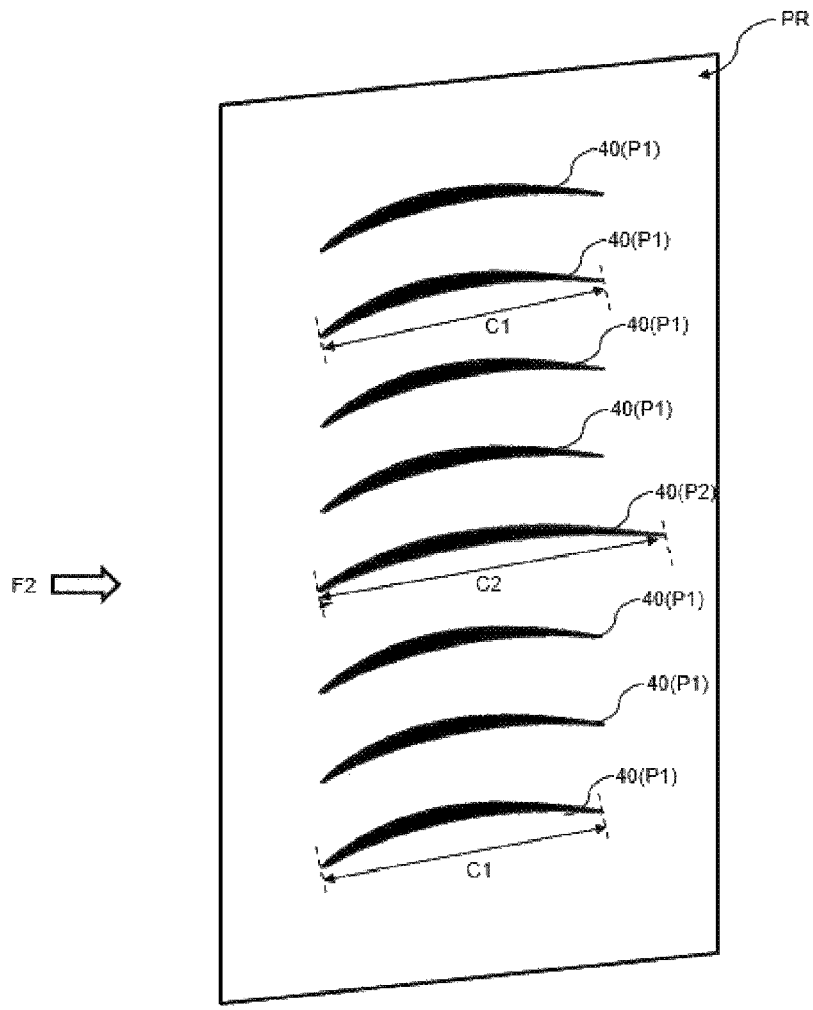
FIG. 4 is a sectional view in a plane of revolution of stator vanes of a first embodiment of a stator wheel according to the invention and FIG. 5 is a sectional view in a plane of revolution of the stator vanes of a second embodiment of a stator wheel according to the invention.

With reference to FIG. 4, 7 vanes 40 having a first aerodynamic profile P1 with a first chord C1 and a single vane 40 having a second thermal profile P2 with a second chord C2 are shown in the plane of revolution PR. In this example, the second chord C2 is longer than the first chord C1 so as to maximize heat exchanges. Unlike general practice that always imposed the use of vanes 40 with an identical chord, this invention is contrary to prior art and discloses a specialization of certain vanes 40 such that they perform their function optimally.

Preferably, the difference in chords C1, C2 between two adjacent vanes 40 is less than 50%, and is even more preferably less than 25%. Such a characteristic makes it possible to have a substantially continuous variation of the aerodynamic/thermal characteristics, so that the performances of the turbomachine 1 and in particular, the local flow performances in the vicinity of the vane 40 having a second thermal profile P2 with a second chord C2 do not need to be affected. Preferably, the difference in chords C1, C2 between two adjacent vanes 40 is greater than 5%, and even more preferably greater than 10% in order to specialize the vanes 40.

Depending on the type of turbomachine, when the first chord C1 of the first aerodynamic profile P1 is too far away from the second chord C2 of the second thermal profile P2, one solution is to provide interleaved vanes 40 with interleave profiles P31, P32.

Two profiles P1, P2, have been presented to optimize firstly aerodynamic performances, and secondly thermal performances. Obviously, other specialized profiles could be provided, in particular to optimize mechanical and structural performances.

Figure 5:
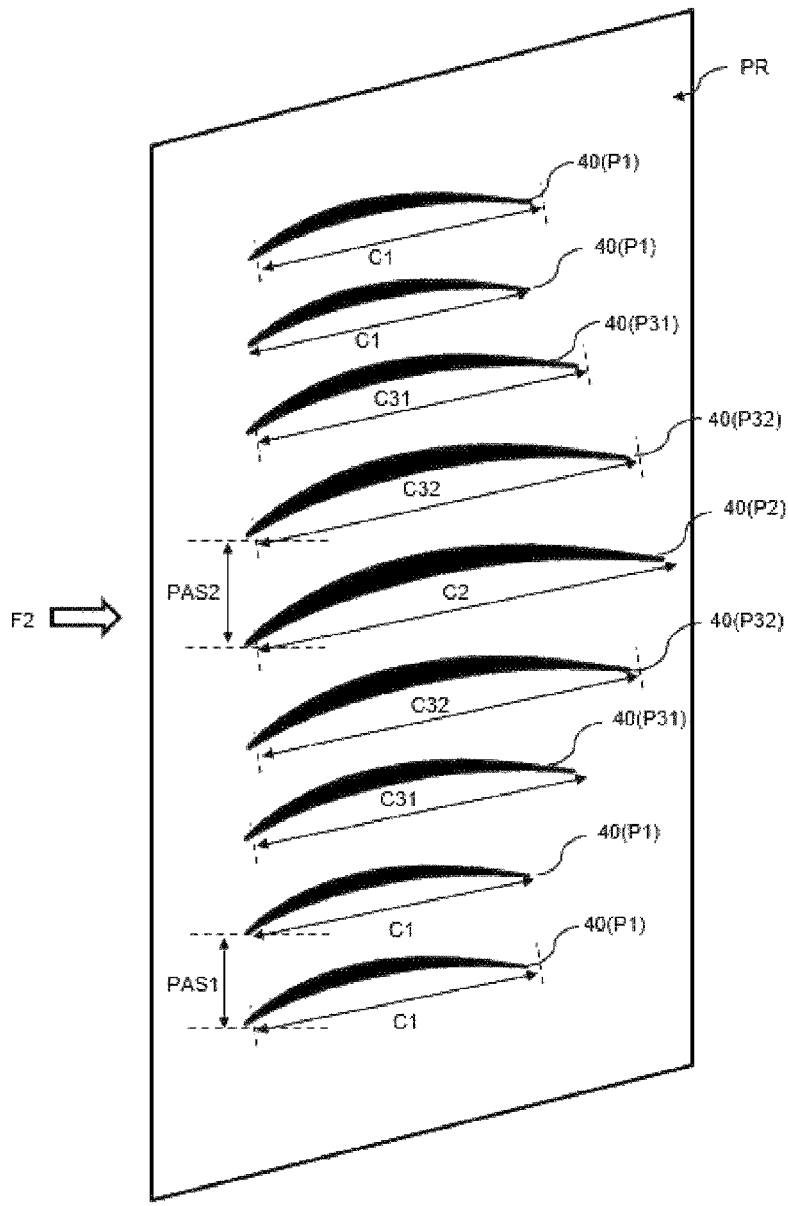

FIG. 5 presents interleaved vanes 40 having a first interleave profile P31 with a first interleave chord C31, and interleaved vanes 40 having a second interleave profile P32 with a second interleave chord C32. In this embodiment, the chords are sorted into increasing order according to the sequence: C1 (smallest chord), C31, C32, C2 (largest chord). The chord variation increases between the minimum chord C1 and the maximum chord C2. In this example, the difference in chords between two adjacent vanes is less than 50%, and is even more preferably less than 25%.

In practice, as will be presented below, the number of interleaved vanes 40 between a vane 40 with a first profile P1 and a vane 40 with a second profile P2 is defined as a function of the difference between the first chord C1 and the second chord C2 and the acceptable difference in chords C between two adjacent vanes 40.

As illustrated in FIG. 5, the profiles of the vanes 40 are arranged consecutively according to the following sequence of chords: C1, C1, C31, C32, C2, C32, C31, C1, C1. Such a sequence is advantageous because it makes it possible to integrate a vane 40 with a second thermal profile P2 among a set of vanes 40 with a first aerodynamic profile P1 that is far from the second thermal profile P2. The use of interleaved vanes 40 advantageously makes it possible to avoid any discontinuity in the heat and aeronautical treatment so as to not disturb operation of turbomachine 1. The chord variation is advantageously progressive.

The stator wheel 4 according to the invention advantageously makes it possible to straighten the air flow and to guarantee the required mechanical function, while limiting the difference in chords C between two adjacent vanes (40). This advantageously makes it possible to provide a smooth transition between the profiles of the vanes 40 so as to limit disturbances to the second air flow F2.

Two types of interleaved vanes 40 were presented in this example, but obviously the number could be different.

Preferably, a stator wheel 4 according to the invention comprises a limited number of vanes 40 with a different chord C. Such a stator wheel 4 comprises a maximum of ten vanes 40 with different chords C, so as to advantageously limit manufacturing and assembly constraints.

A first aerodynamic profile P1 and a second thermal profile P2 with different chords C1, C2 have been presented. Obviously, the first aerodynamic profile P1 and the second thermal profile P2 could comprise one or more other different characteristics, in particular the maximum thickness Ep, the pitch PAS, the angle of incidence θ.

According to one aspect, the first aerodynamic profile P1 and the second thermal profile P2 have chords C1, C2 that are different but they have same maximum thickness Ep so as to limit the variation in the section between two adjacent vanes 40, which limits local flow disturbances.

According to another aspect, the first aerodynamic profile P1 and the second thermal profile P2 have different chords C1, C2 and different maximum thicknesses Ep so as to have constant relative thicknesses, in other words a constant ratio between the maximum thickness Ep and the chord C of the vane 40. Such an alternative makes it possible to guarantee the mechanical characteristics of the profiles P1, P2 (flexibility, natural frequency, etc.).

In the preceding example, the chord of a vane 40 is defined as a function of the chords C of adjacent vanes 40. However, it is obvious that the chord C of each vane 40 could equally well be fixed independently of the chord C of adjacent vanes 40 on the stator wheel 4. According to this alternative, the geometry of each vane 40 is unique and enables an optimum configuration of the stator wheel 4 as a function of performance requirements.

Preferably, the pitch PAS between two vanes 40 is independent of the chord C, so if the pitch PAS is identical but the chord C is different for two adjacent vanes 40, then the relative pitch (in other words the ratio between the pitch PAS and the chord C varies as a function of the chord C) is different between two vanes 40. Alternatively, the pitch PAS between two vanes 40 with different chords C may be different (as shown in FIG. 5 with a first pitch PAS1 and a second pitch PAS2).

Optionally, the variation of the chord C between two vanes 40 can be coupled to a variation in the angle of incidence θ of the vanes 40 as described above. Advantageously, such a modification makes it possible to limit the aerodynamic distortion of an air flow applied from downstream to upstream of the turbomachine 1 on the stator wheel 4, for example when the airplane is in flight.

A stator wheel 4 comprising several vanes 40 with the first aerodynamic profile P1 and a single vane 40 with the second thermal profile P2 have been presented with reference to FIG. 5. Obviously, the invention also applies to a stator wheel 4 comprising several vanes 40 with a second thermal profile P2 and a single vane 40 with a first aerodynamic profile P1. Similarly, two profiles P1, P2, have been presented to optimize firstly aerodynamic performances, and secondly thermal performances. Obviously, other specialized profiles could be provided, in particular to optimize mechanical and structural performances.

The integration of a stator wheel 4 comprising vanes 40 with different chords C has the advantage that it makes it possible for the wheel to perform aerodynamic, structural, and thermal roles, while limiting the penalization to performances of the turbomachine 1, that would occur if all the vanes 40 were identical.

The invention claimed is:

1. A stator wheel of a turbomachine configured to be mounted in an aircraft, the turbomachine extending along an axis, the turbomachine comprising a core flow stream for a first air flow and a bypass flow stream for a second air flow, wherein the stator wheel is configured to be mounted along the axis, the stator wheel comprising a plurality of vanes extending radially from the axis, each vane comprising a leading edge and a trailing edge that together define a chord in a plane of revolution defined relative to the axis, and wherein the stator wheel has at least two adjacent vanes having different chords at a same radial distance, the difference in chords between the at least two adjacent vanes being less than or equal to 25%.

2. The stator wheel according to claim 1, wherein at least one vane has a first minimum chord and at least one vane has a second maximum chord, and wherein the stator wheel comprises at least one interleaved vane, mounted between said at least one vane with the first minimum chord and said at least one vane with the second maximum chord, having a third chord between said first chord and said second chord.

3. The stator wheel according to claim 2, wherein the stator wheel comprises at least two interleaved vanes having different chords between said first chord and said second chord.

4. The stator wheel according to claim 2, wherein the chords increase between said first chord and said second chord.

5. The stator wheel according to claim 1, wherein the difference in chords between two adjacent vanes is greater than or equal to 5%.

6. The stator wheel according to claim 1, wherein the difference in chords between at least two adjacent vanes is greater than or equal to 10%.

7. The stator wheel according to claim 1, wherein a difference in maximum thickness between the at least two adjacent vanes with different chords is less than or equal to 5%.

8. The stator wheel according to claim 1, wherein, a relative thickness of a vane corresponding to a ratio of vane's the maximum thickness Ep and the vane's chord, and wherein a difference in the relative thickness between two adjacent vanes with different chords is less than or equal to 10%.

9. The stator wheel according to claim 1, wherein the difference in chords applies to all adjacent vanes of the stator wheel.

10. A turbomachine configured to be mounted in an aircraft, the turbomachine extending along an axis, said turbomachine comprising a core flow stream for circulation of a first air flow and a bypass flow stream for circulation of a second air flow, and wherein the stator wheel according to claim 1, is mounted along the axis.

11. An aircraft comprising the turbomachine according to claim 10.

* * * * *